US009229776B2

(12) United States Patent
Imbert

(10) Patent No.: US 9,229,776 B2
(45) Date of Patent: Jan. 5, 2016

(54) COMPUTATIONAL EXPANSION SYSTEM

(75) Inventor: Herve Imbert, Madrid (ES)

(73) Assignee: IMBERT MANAGEMENT CONSULTING SOLUTIONS, Madrid (ES)

( * ) Notice: Subject to any disclaimer, the term of this patent is extended or adjusted under 35 U.S.C. 154(b) by 1442 days.

(21) Appl. No.: 11/920,884

(22) PCT Filed: May 31, 2005

(86) PCT No.: PCT/ES2005/070076
§ 371 (c)(1),
(2), (4) Date: Jun. 29, 2009

(87) PCT Pub. No.: WO2006/128925
PCT Pub. Date: Dec. 7, 2006

(65) Prior Publication Data
US 2009/0307465 A1 Dec. 10, 2009

(51) Int. Cl.
*G06F 9/46* (2006.01)
*G06F 15/173* (2006.01)
*G06F 9/50* (2006.01)

(52) U.S. Cl.
CPC ............ *G06F 9/5027* (2013.01); *G06F 9/5044* (2013.01); *G06F 2209/509* (2013.01)

(58) Field of Classification Search
CPC ...... G06F 9/5005; G06F 9/5027; G06F 9/505

USPC .............................................. 718/104; 1/104
See application file for complete search history.

(56) References Cited

U.S. PATENT DOCUMENTS

| 6,128,279 | A   | * | 10/2000 | O'Neil et al. ....... H04L 67/1008 370/229 |
| 6,292,822 | B1  | * | 9/2001  | Hardwick ............... G06F 8/451 718/102 |
| 6,370,599 | B1  | * | 4/2002  | Anand et al. .................... 710/15 |
| 6,430,640 | B1  | * | 8/2002  | Lim ........................ G06F 13/18 710/200 |
| 6,466,965 | B1  |   | 10/2002 | Chessell et al. |
| 6,542,920 | B1  |   | 4/2003  | Belkin et al. |
| 6,728,961 | B1  | * | 4/2004  | Velasco ......................... 718/105 |
| 6,912,533 | B1  | * | 6/2005  | Hornick ................. G06F 9/505 707/700 |
| 7,073,174 | B2  | * | 7/2006  | Volkoff et al. ................ 718/102 |
| 7,181,524 | B1  | * | 2/2007  | Lele .................... H04L 67/1008 709/224 |
| 2004/0088206 | A1 | * | 5/2004 | Thompson et al. ............... 705/7 |
| 2005/0204045 | A1 |   | 9/2005 | Belkin et al. |
| 2006/0155633 | A1 | * | 7/2006 | Fellenstein et al. ............. 705/37 |

* cited by examiner

*Primary Examiner* — Abdulla Al Kawsar
(74) *Attorney, Agent, or Firm* — Ladas & Parry LLP

(57) ABSTRACT

The invention relates to a system for expanding capacity for executing processes that are executed in a central processing unit (12) which can be connected to a computational expansion means (11) comprising a task management means (32) which, by means of an internal management means (53), receives a request to delegate the execution of a pre-determined process from the central processing unit (12) to a plurality of process management means (33).

20 Claims, 3 Drawing Sheets

HOST EXECUTOR SEQUENCE
DELEGATE PROCESS EXECUTION SEQUENCE
PROCESS DELEGATION MANAGEMENT

HOST EXECUTOR SEQUENCE
DELEGATE PROCESS EXECUTION SEQUENCE
PROCESS DELEGATION MANAGEMENT

COMPUTATIONAL EXPANSION SYSTEM

OBJECT OF THE INVENTION

The present invention generally relates to a computational expansion means that is connected to one or several central processing units, so that said central processing units delegate partial or total execution of any of the processes that are executed by them to said computational expansion means.

The central processing unit retrieves the result of the execution of the process delegated to the computational expansion means as if the central processing unit had calculated it.

STATE OF THE ART

Currently there is a growing demand for automatically processing more and more information. The automatic processing of said information is carried out in a central computer referred to as a host. The increase in the information processing demand in a host, which has a certain process capacity, has the disadvantage that its resources have to be shared by all processes that are being executed at a certain moment, reducing the response capacity and the performance of the host.

One way of preventing said performance and response capacity reduction of the host due to the increase in the process demand is to increase the processing capacity of said host. However, increasing the processing capacity entails the disadvantage of a substantial increase in the cost of incorporating new resources.

It must also be taken into account that the processing capacity of the host is not always used continuously and permanently, since the process demand fluctuates over time, causing consumer peaks that mark the process needs in order to guarantee a minimum service level, generating a waste of the host's resources at the trough moments.

Furthermore on those occasions in which, due to physical limitations of the host, it is not possible to increase its process capacity by increasing its resources; either a change in computer for a more powerful computer is required, or the incorporation of a new computer that complements the existing computer is required, making the redesigning of the logic of the computer programs necessary in order to adapt them to execution in several computers.

Therefore, it is necessary to develop a computational means that allows processes from a central computer or host to be taken on without damaging the performance of that host and without changing the logic of the programs that are executed in said host, such that the result of the processes that are executed in said computational means are made available to the host in the same manner as if they have been calculated by the host itself.

CHARACTERIZATION OF THE INVENTION

The present invention looks to solve or reduce one or more of the drawbacks set forth above by means of a computational expansion means which can be connected to a central processing unit so that it takes on the processes that are executed in said central processing unit as is claimed in claim 1. Embodiments of the invention are provided in the dependent claims.

One object of the invention is to provide a connection mechanism for connecting the computational expansion means with a computer system, process management means so that they execute a process delegated by the central processing unit without changing the logic or the execution sequence of said process delegated by said central processing unit.

Another object of the invention is to provide the mechanism for managing the process delegation of the central processing unit to the computational expansion system.

Still another object of the invention is to enable a data exchange process between the central computer and the computational expansion system.

Another object of the invention is to create a platform compatible with the host, not through a simulation/emulation of the host environment on a more economical platform, but rather by using programs that do the same thing as in the host but running natively on an open system platform (or Windows environment), i.e. either reusing programs of third parties or recompiling host programs.

Yet another object of the invention is to dynamically assign the process capacity of the computational expansion system process according to the required demand, namely the process delegated by the host.

BRIEF EXPLANATION OF THE DRAWINGS

A more detailed explanation of the invention is given in the following description based on the attached figures in which.

DESCRIPTION OF THE INVENTION

Figure 1:
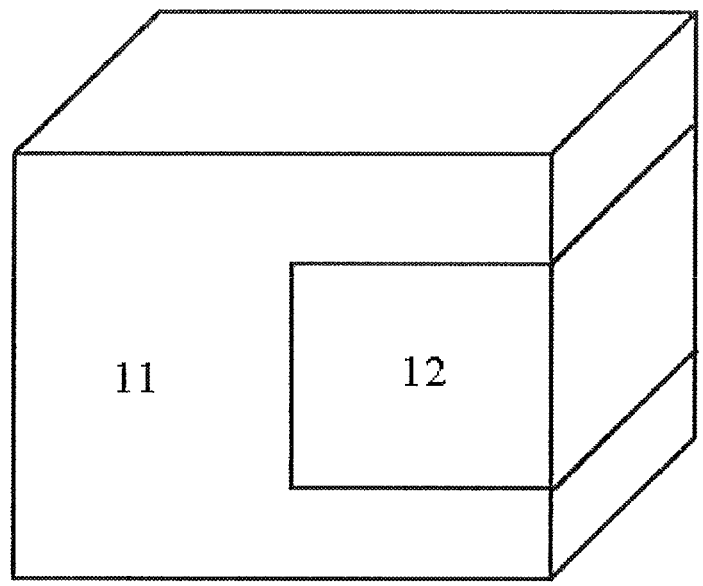
FIG. 1 shows a computational expansion means which can be connected to a host according to the invention.

Below, with reference to FIG. 1, a configuration of the system of the invention is illustrated in which a computational expansion means 11 can be connected to a central processing unit 12, namely a host by means of an interconnection system such as a communications network, a local area network or the like.

Figure 2:
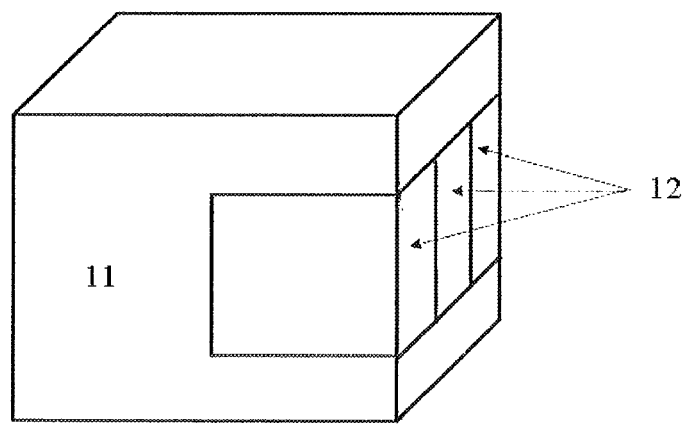
FIG. 2 shows the computational expansion system connected to several hosts according to the invention.

The same computational expansion system 11 can be simultaneously connected to several hosts 12 by means of the communications network as shown in FIG. 2.

Figure 3:
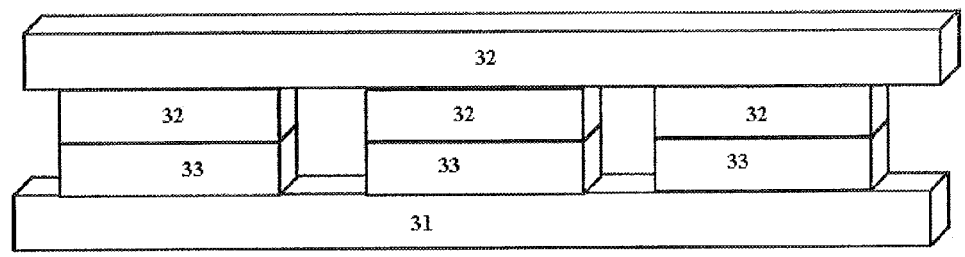
FIG. 3 shows a diagram of the modules that the computational expansion system according to the invention includes.

Now in relation to FIG. 3, the computational expansion system 11 comprises a task management means 32, a plurality of process management means 33 and a shared storage management means 31, where the calculation capacity of the computational expansion system 11 is defined by the number of process managers 33 available in the computational expansion system 11 at all times.

The task manager 32 is the module of the computational expansion system 11 responsible for coordinating the execution of a process delegated by the host 12 between the different process managers 33 available in the computational expansion system 11. For this purpose, the host 12 makes a request for a pre-determined process, for example a program comprising flat files, to be executed in the computational expansion system 11. The request of the host 12 is received in the task manager 32 by means of an internal management means 53 that is able to negotiate the execution of the process delegated by the host 12 with the process managers 33.

Accordingly, the task manager 32 is responsible for arbitrating the execution, between all the available process managers 33, of the process delegated by the host 12, where it could be the case that the task manager 32 rejects the execution of a certain process by considering that the process expansion system 11 does not have sufficient capacity to execute said delegated process. In this case the process will be executed in the host 12.

Figure 5:
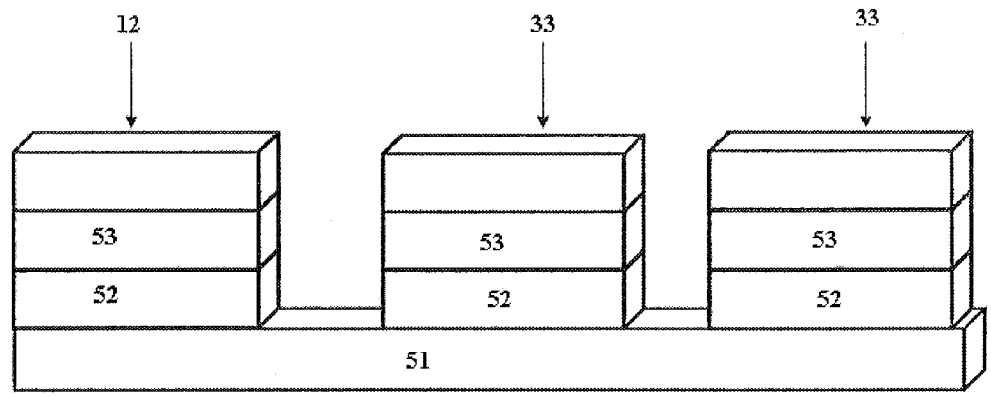
FIG. 5 shows a task management means according to the invention.

In relation to FIG. 5, the task manager 32 includes:

An interconnection means 51 connected on one side to the host 12, and on the other side to the different modules of the computational expansion system 11.

An infrastructure management means 52 that allows exchanging data and/or messages between the host 12 which delegated the execution of a pre-determined process, and the set of process managers 33 that will execute said delegated process through the interconnection system 51.

The internal manager 53 is responsible for designating which process manager/s 33 will execute the process delegated by the host 12, said process will be assigned to a process manager 12 that is capable of executing the delegated process with a lower cost than if it was executed by the host 12.

For each process executed in a host 12, a pre-determined cost value for executing the process the execution of which is to be delegated is previously established; the calculation of the cost parameter is a function of specific physical parameters of the process manager 33, such as the speed of the microprocessor, the RAM memory, hard drive capacity, the type of graphics card that can include a microprocessor or not, the motherboard, bus speed, i.e. the speed at which the different means connected in the motherboard communicate, or the like.

The internal manager 53 is capable of assigning, on the basis of the cost received from each process manager 33 and host 12, the execution of the process delegated by the host 12.

It must be observed that the cost parameter is variable over time given that, for example, a certain process manager 33 is executing a first process and the internal manager 53 requests its cost parameter in order to execute a second process, since part of its operative capacity is compromised in the execution of the first process, it will consequently give a cost parameter value on the basis of the operative capacity not compromised, i.e. available for executing a second process. Therefore the internal manager 53 will receive from this manager 33 a different cost from the cost given by it for the first process, since part of its operative capacity is occupied in the execution of the first process.

The internal manager 53 assigns the process to the means 33, 12 having sent a lower cost value, it being possible that the delegated process be executed simultaneously in two means 33, 12 in parallel, i.e. redundantly.

Accordingly, the internal manager 53 is capable of identifying the availability of each process manager 33 and of structuring the logical connections thereof in order to make optimal execution of the delegated process possible, i.e. on the basis of the performance features determined by the given cost value.

Figure 4:
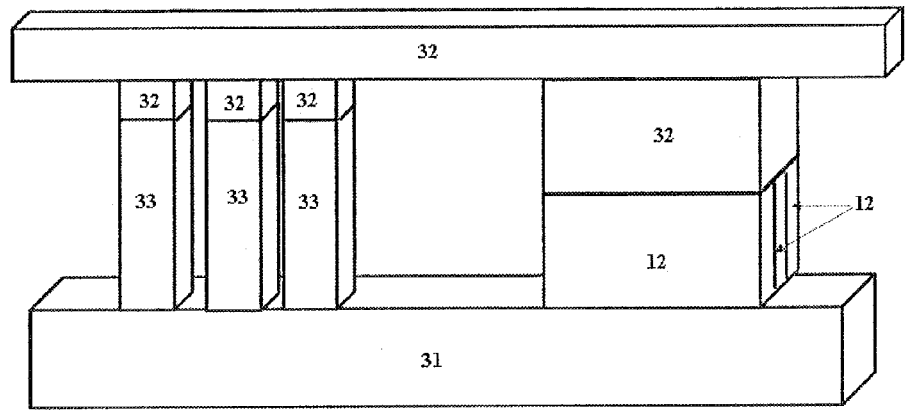
FIG. 4 shows a detail of the connection of the computational expansion system connected to several hosts according to the invention.

To summarize, the task manager 32 is simultaneously connected to the host 12 and to each process manager 33, said connection is established through the internal manager 53, which in turn is connected to the infrastructure manager 52 which is connected to the infrastructure system 51, shown in FIGS. 4 and 5.

The shared storage manager 31 is the unit in which the data shared by both the host 12 and the computational expansion system 11 will be located, such that it provides a storage extension that can be simultaneously shared by the host 12 and the computational expansion system 11.

The shared storage manager 31 can be managed by the host 12 and placed therein are both the data from the host 12 that will be necessary for executing the process delegated to the computational expansion system 11 as well as the data obtained by the execution of the process delegated to the computational expansion system 11 will, which will later be used either for other processes in the computational expansion system 11, or by other processes executed by the same host 12.

From the side of the host 12, the storage provided by the shared storage manager 31 is an extension of its own storage capacity such that the processes of the host 12 can treat the data placed in this storage manager 31 in the same way that they treat the data located in their internal storage means, i.e. the storage manager 31 places the data received from the host 12 in the corresponding format, suitable for its direct retrieval without prior processing before being used by the process manager 33. As a result, the process manager 33 does not need to occupy part of its operative capacity in processing the data retrieved from the storage manager 31 and left by the host 12 before using them in executing the process delegated to the process manager 33.

The interaction between the host 12 and the computational expansion system 11 is carried out through the task manager 32 and specifically by means of the internal manager 53, which on the basis of a set of pre-determined criteria negotiates and, where applicable, requests the execution of a certain process the data of which has been placed by the host 12 in the shared storage manager 31.

At first, the host 12 requests the delegated execution of a certain process on the basis of the set of criteria of the administrator of the host 12, although in an extreme situation, an administrator could request to delegate all the processes to the computational expansion system 11. In this case the expansion system 11 would allow the delegated processes until it reaches a pre-determined overflow level after which it could not take on more processes.

Therefore, the task manager 32 receives a request from the host 12 to execute a certain process in the computational expansion system 11 through the internal manager 53 and notifies the computational expansion system 11 of the demand of the host 12.

Once the internal manager 53 has received the demand of the host 12, it analyzes the capacity of each process manager 33 for carrying out the execution requested by the host 12, obtaining the available operative capacity, i.e. it requests from each one of them their cost parameter value, and in turn informs the rest of the process managers 33 of the capacity of the other process managers.

Once a pre-determined amount of time has passed in which it receives all the cost values, the internal manager 53 makes the decision to assign the execution of the delegated process to the process managers 33 that reported the best capacity for carrying out the execution of the delegated process, at a lower cost.

The chosen process manager 33 will execute the delegated process by placing the result of the process in the storage manager 31 and will notify the task manager 32 of the completion of the process, so that the task manager can notify the host 12 of the completion of the delegated process.

The possibility that a host 12 delegates a sequence of several processes and that these processes can be executed in different process managers 33 has been considered in this outline.

Figure 6:
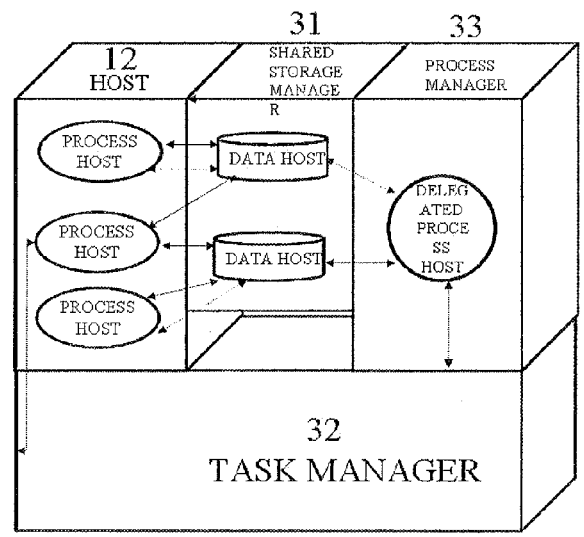
FIG. 6 shows the process carried out by the expansion system for expanding the computational capacity of the host.

FIG. 6 shows the process carried out by the expansion system for expanding the computational capacity of the host 12. As is shown the process begins in the host 12 which places the information data relating to the process that it wishes to delegate to the storage manager 31, the host 12 also communicates its request to delegate a process to the task manager 32 which selects the process manager/s 33 that will execute the process delegated from the host 12. Once the execution of the process has been completed, the generated output data is stored in the storage manager 31 from where the host 12 retrieves the data in order to continue with the execution of other processes.

In summary, the device and method described herein provide process execution architecture for processes that are executed in a computerized environment that reduces the time and resources used in the execution of processes that would be executed in the host 12.

It must likewise be observed that the present invention can be implemented in a variety of computer environments comprising programmable computers including a processor, computer-readable storage means that including volatile and non-volatile memory elements and/or storage elements. The computational hardware logic, which cooperates with diverse sets of instructions, is applied to the data in order to carry out the previously described functions and to generate output information. The programs used by the computational hardware taken as an example can be implemented preferably in diverse programming languages, including a high level programming language oriented towards processes or objects for communicating with a computer system. Each computer program is preferably stored in a storage device or means (for example, ROM or magnetic disc) which is readable by a general programmable computer or especially for configuring and operating the computer when the storage device or means is read by the computer with the purpose of executing the previously described processes. It can likewise be considered that the storage manager be implemented as a computer-readable storage means, configured with a computer program, in which the storage means thus configured makes a computer work in a predefined and specific way.

The embodiments and examples provided in this specification are presented as the best explanation of the present invention and its practical application and to thus allow that persons skilled in the art put the invention into use and use it. Nevertheless, the persons skilled in the art will recognize that the previous description and the examples have been presented with an illustrative and exemplary purpose. The description as it is set forth is not intended to be exhaustive or to limit the invention to the precise from described. Many modifications and variations are possible in light of the previous teaching without departing from the spirit and scope of the following claims.

The invention claimed is:

1. A system of expanding the capacity of executing processes executable in at least one central processing unit, by delegating execution of a process to a system platform when certain conditions are met, the system comprising:
the at least one central processing unit;
a computational expansion system connected to the at least one central processing unit through a communications system, wherein the computational expansion system comprises an internal manager configured to receive a message from the at least one central processing unit (1) requesting execution of a delegated process and (2) providing a cost value for executing the delegated process by the at least one central processing unit; and
the system further comprising the system platform connected to the computational expansion system, the system platform being compatible with the at least one central processing unit, the system platform using program logic that performs the same processing as the at least one central processing unit, the system platform comprising a plurality of process managers each being configured to calculate its own cost value for executing the delegated process as a function of its current operative capacity for executing the delegated process;
wherein the internal manager is further configured to (1) compare the cost values calculated by the process managers with the cost value received from the at least one central processing unit, and (2) select from the plurality of process managers an available process manager having a cost value that is lower than the cost value received from the at least one central processing unit;
wherein the internal manager is further configured to dynamically assign the selected process manager to execute the delegated process;
wherein if there are no available process managers having sufficient capacity to execute the delegated process or that can execute the delegated process at a lower cost value than the cost value received from the at least one central processing unit, the internal manager rejects execution of the delegated process and directs the at least one central processing unit to execute the delegated process;
wherein the computational expansion system further comprises a storage manager configured to be an extension of a storage capacity of the at least one central processing unit and simultaneously shared with the computational expansion system; and
wherein the storage manager is further configured to store data from the at least one central processing unit in a format recognized by the selected process manager and also to store data information provided by the selected process manager to the central processing unit when the delegated process is executed.

2. The system according to claim 1, wherein the cost values for executing the delegated process calculated by each process manager are a function of specific physical parameters of each process manager, including microprocessor speed, RAM memory, hard drive capacity, graphics card type, and bus speed.

3. The system according to claim 1, wherein a calculation capacity of the system platform is defined by the number of process managers available in the system platform at all times.

4. The system according to claim 1, wherein the internal manager selects more than one available process manager, in which case each selected process manager executes the delegated process simultaneously in parallel.

5. The system according to claim 1, wherein the internal manager is further configured to receive a notification from the selected process manager that the delegated process has been executed.

6. The system according to claim 5, wherein the internal manager is further configured to send, to the at least one central processing unit, the notification that the delegated process has been executed.

7. A method for expanding the capacity of executing processes which are executable in at least one central processing unit connected to a computational expansion system through a communications system, by delegating execution of a process to a process manager when certain conditions are met, said method comprising the steps of:

receiving in an internal manager of the computational expansion system a message from the at least one central processing unit (1) requesting execution of a delegated process and (2) providing a cost value for executing the delegated process by the at least one central processing unit;

calculating in each of a plurality of process managers a cost value for executing the delegated process by the each process manager, as a function of current operative capacity for executing the delegated process;

comparing, by the internal manager, the cost values calculated by the process managers with the cost value received from the at least one central processing unit;

selecting, by the internal manager, an available process manager having a cost value that is lower than the cost value received from the at least one central processing unit, to execute the delegated process;

dynamically assigning, by the internal manager, the selected process manager to execute the delegated process; and executing the delegated process by the selected process manager;

wherein if there are no available process managers having sufficient capacity to execute the delegated process or that can execute the delegated process at a lower cost value than the cost value received from the at least one central processing unit, the internal manager rejects execution of the delegated process and directs the at least one central processing unit to execute the delegated process;

wherein the computational expansion system further comprises a storage manager configured to be an extension of a storage capacity of the at least one central processing unit and simultaneously shared with the computational expansion system; and wherein the storage manager is further configured to store data from the at least one central processing unit in a format recognized by the selected process manager and also to store data information provided by the selected process manager to the central processing unit when the delegated process is executed.

8. The method according to claim 7, wherein the cost values for executing the delegated process calculated by each process manager are a function of specific physical parameters of each process manager, including microprocessor speed, RAM memory, hard drive capacity, graphics card type, and bus speed.

9. The method according to claim 7, wherein the selected process manager executes the delegated process with the same logic and execution sequence as if the delegated process was executed by the at least one central processing unit.

10. The method according to claim 7, wherein a calculation capacity of the plurality of process managers is defined by the number of process managers available in the system platform at all times.

11. The method according to claim 7, wherein the internal manager selects more than one available process manager, in which case each selected process manager executes the delegated process simultaneously in parallel.

12. The method according to claim 7, further comprising the step of receiving, by the internal manager, a notification from the selected process manager that the delegated process has been executed.

13. The method according to claim 12, further comprising the step of sending, by the internal manager to the at least one central processing unit, the notification that the delegated process has been executed.

14. A non-transitory computer-readable medium storing a program which, when executed by at least one processor, performs a method for expanding the capacity of executing processes which are executable in at least one central processing unit connected to a computational expansion system through a communications system, by delegating execution of a process to a process manager when certain conditions are met, said method comprising the steps of:

receiving in an internal manager of the computational expansion system a message from the at least one central processing unit (1) requesting execution of a delegated process and (2) providing a cost value for executing the delegated process by the at least one central processing unit;

calculating in each of a plurality of process managers a cost value for executing the delegated process by the each process manager, as a function of current operative capacity for executing the delegated process;

comparing, by the internal manager, the cost values calculated by the process managers with the cost value received from the at least one central processing unit;

selecting, by the internal manager, an available process manager having a cost value that is lower than the cost value received from the at least one central processing unit, to execute the delegated process;

dynamically assigning, by the internal manager, the selected process manager to execute the delegated process; and executing the delegated process by the selected process manager;

wherein if there are no available process managers having sufficient capacity to execute the delegated process or that can execute the delegated process at a lower cost value than the cost value received from the at least one central processing unit, the internal manager rejects execution of the delegated process and directs the at least one central processing unit to execute the delegated process;

wherein the computational expansion system further comprises a storage manager configured to be an extension of a storage capacity of the at least one central processing unit and simultaneously shared with the computational expansion system; and wherein the storage manager is further configured to store data from the at least one central processing unit in a format recognized by the selected process manager and also to store data information provided by the selected process manager to the central processing unit when the delegated process is executed.

15. The medium according to claim 14, wherein the cost values for executing the delegated process calculated by each process manager are a function of specific physical parameters of each process manager, including microprocessor speed, RAM memory, hard drive capacity, graphics card type, and bus speed.

16. The medium according to claim 14, wherein the selected process manager executes the delegated process with the same logic and execution sequence as if the delegated process was executed by the at least one central processing unit.

17. The medium according to claim 14, wherein a calculation capacity of the plurality of process managers is defined by the number of process managers available in the system platform at all times.

18. The medium according to claim 14, wherein the internal manager selects more than one available process manager, in which case each selected process manager executes the delegated process simultaneously in parallel.

19. The medium according to claim 14, wherein the method further comprising the step of receiving, by the internal manager, a notification from the selected process manager that the delegated process has been executed.

20. The medium according to claim 19, wherein the method further comprising the step of sending, by the internal manager to the at least one central processing unit, the notification that the delegated process has been executed.

* * * * *